United States Patent
Lindsay et al.

(10) Patent No.: US 10,057,606 B2
(45) Date of Patent: Aug. 21, 2018

(54) SYSTEMS AND METHODS FOR AUTOMATED APPLICATION OF BUSINESS RULES USING TEMPORAL METADATA AND CONTENT FINGERPRINTING

(71) Applicant: Disney Enterprises, Inc., Burbank, CA (US)

(72) Inventors: David Lindsay, Los Angeles, CA (US); Lena Bareket, Los Angeles, CA (US); Nimesh Narayan, Los Angeles, CA (US); Yoomi Koh Poon, Arcadia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 56 days.

(21) Appl. No.: 14/991,834

(22) Filed: Jan. 8, 2016

(65) Prior Publication Data
US 2017/0201774 A1   Jul. 13, 2017

(51) Int. Cl.
*H04N 21/442* (2011.01)
*H04N 21/234* (2011.01)
*H04N 21/235* (2011.01)
*H04N 21/8352* (2011.01)

(52) U.S. Cl.
CPC ... *H04N 21/2353* (2013.01); *H04N 21/23418* (2013.01); *H04N 21/44204* (2013.01); *H04N 21/8352* (2013.01)

(58) Field of Classification Search
CPC ............... G06Q 30/02; G06Q 30/0247; G06Q 30/0254; G06Q 30/0274; G06F 17/3074; G06F 17/30743; G06F 17/30784; H04H 2201/00; H04H 2201/90; H04H 60/37; H04H 60/58; H04L 9/32; H04L 9/3247; H04L 9/3255
See application file for complete search history.

(56) References Cited

U.S. PATENT DOCUMENTS

| | | | |
|---|---|---|---|
| 2003/0221196 A1* | 11/2003 | Connelly | H04N 5/445 725/110 |
| 2010/0262488 A1* | 10/2010 | Harrison | G06Q 30/02 705/14.46 |
| 2012/0016724 A1* | 1/2012 | Harrison | G06Q 30/02 705/14.7 |

* cited by examiner

*Primary Examiner* — Nathan Flynn
*Assistant Examiner* — Christine Kurien
(74) *Attorney, Agent, or Firm* — Sheppard Mullin Richter & Hampton LLP

(57) ABSTRACT

According to various embodiments of the disclosed technology, it is possible for content owners to better control the presentation of owned multimedia assets. Implementations of embodiments of the technology of the present disclosure leverage the specificity and greater breadth of detailed information about the multimedia asset of temporal metadata to enable content owners to associate business rules with particular content elements of the multimedia asset. After being notified of a match through the traditional fingerprinting process, embodiments in accordance with the present disclosure can programmatically identify the exact content elements contained within the uploaded multimedia file, and accordingly apply the applicable rules. Content owners may create a list of business rules associated with particular temporal metadata tags of a multimedia assets so that fine-grained rule application is possible.

14 Claims, 5 Drawing Sheets

SYSTEMS AND METHODS FOR AUTOMATED APPLICATION OF BUSINESS RULES USING TEMPORAL METADATA AND CONTENT FINGERPRINTING

TECHNICAL FIELD

The disclosed technology relates generally to media content playback, and more particularly, some embodiments relate to applying business rules to media content utilizing temporal metadata of the media content.

DESCRIPTION OF THE RELATED ART

Metadata is information associated with a data file that is not part of the content of the data file, but provides information about the data within the data file. For example, metadata associated with a word processor document may provide information about when the document was created, who created the document, the size of the document, and the number of pages of the document. In other words, metadata is "data about data."

Digital video fingerprinting is a technique that assists computers in identifying a piece of media content. A video fingerprint is a compact digital representation of unique characteristics of a piece of media content. Video fingerprinting creates a unique digital profile, based on audio and/or visual characteristics of the media content, which may be utilized by media content owners and/or third parties to identify when the media content is being viewed or uploaded to different video sources. Such fingerprinting may be utilized to identify when a piece of media content is accessed through a variety of video sources, including television and video streams (e.g., uploaded onto a social media website).

BRIEF SUMMARY OF EMBODIMENTS

According to various embodiments of the disclosed technology, it is possible for content owners to exercise better control over the presentation of owned multimedia assets. Although digital fingerprinting enables external systems to determine whether a multimedia file is a copy, or contains parts, of a content owner's multimedia assets, the external system is only able to identify the specific asset corresponding to the uploaded multimedia file. The content owner is thus limited in the diversity of business rules that may be applied to control the presentation of its owned assets. Implementations of embodiments of the technology of the present disclosure leverage the specificity and greater breadth of detailed information about the multimedia asset of temporal metadata to enable content owners to associate business rules with particular content elements of the multimedia asset. After being notified of a match through the traditional fingerprinting process, embodiments in accordance with the present disclosure can identify the exact content elements contained within the uploaded multimedia file, and accordingly apply the applicable rules. Content owners may create a list of business rules associated with particular temporal metadata tags of a multimedia assets so that fine-grained rule application is possible According to various embodiments of the disclosed technology, a system is provided comprising a multimedia asset owned by a content owner, the multimedia asset being associated with a plurality of temporal metadata tags identifying a plurality of content elements in the multimedia asset; an association engine configured to generate a list associating a business rule with a content element of the plurality of content elements based on at least one of the temporal metadata tags; and a temporal rule applicator configured to receive a notification of a detected digital fingerprint match from an external system based on a digital profile of the multimedia asset, and to determine a business rule applicable to a multimedia file containing at least at a portion of the multimedia asset based on the list.

According to an embodiment of the disclosed technology, a method is provided comprising an association engine scanning a multimedia asset; the association engine identifying a plurality of temporal metadata tags associated with the multimedia asset; the association engine generating a list of content elements present within the multimedia asset based on a plurality of temporal metadata tags associated with the multimedia asset; and the association engine associating a business rule with each content element included within the list of content elements.

According to an embodiment of the disclosed technology, a method is provided comprising a temporal rule applicator receiving a notification of a detected match from an external system the temporal rule applicator identifying a business rule associated with a content element included within a time range of a multimedia asset based on a temporal metadata tags included within the time range; and the temporal rule applicator sending a response to the external system regarding the identified business rule.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
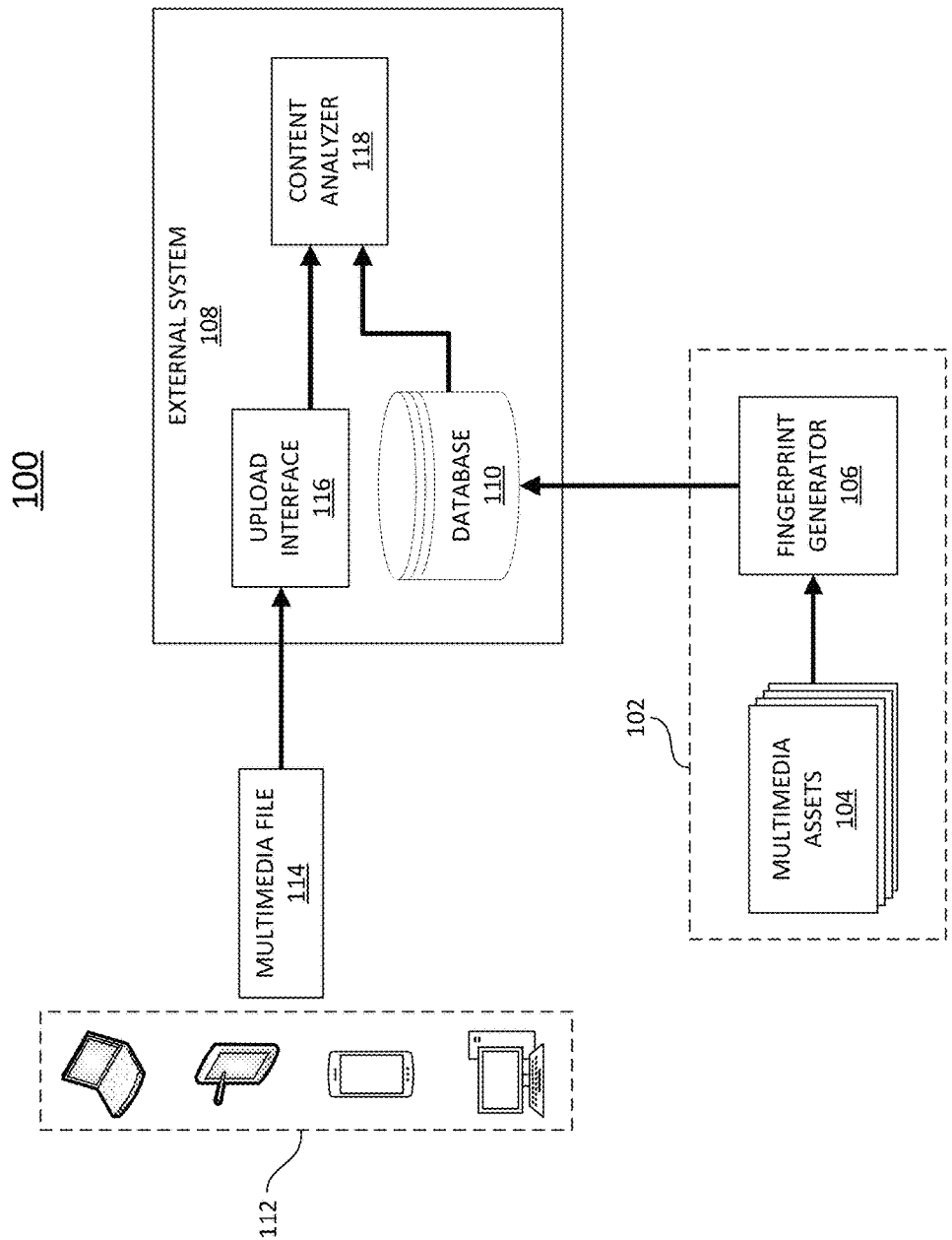
FIG. 1 illustrates an example environment in which embodiments of the technology disclosed herein may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Digital fingerprinting enables computer systems of content owners or third parties to detect and identify whether a particular multimedia asset has been transmitted or uploaded to a content sharing site such as YouTube®. Every multimedia asset has unique characteristics that can be analyzed to identify the asset. Content owners may create unique digital "fingerprints"—one or more unique audio or visual cues—for each multimedia asset, generating a digital profile for the multimedia asset. Each fingerprint is a representation of a sampled portion of the multimedia asset, which may be used to compare an audio or video file uploaded to a website against a known multimedia asset fingerprint to determine if the uploaded file is the media content asset.

Digital fingerprinting is limited, however, in the level of detail provided. By generating one or more fingerprints for each multimedia asset, it is possible to identify if an uploaded audio or video file is a particular asset, but fails to provide information regarding specific content of the asset. Therefore, if a content owner has particular business rules it wishes to apply regarding the display of particular content of a multimedia asset, the content owner must review the uploaded file and perform the identification and rule application process individually for each asset. This process may be time consuming, labor intensive, and may limit the effectiveness of business rules based on the specific content within the media content.

Embodiments of the technology of the present disclosure are directed to systems and methods for automatically applying business rules to multimedia assets. More particularly, the various embodiments of the technology disclosed herein relate to application of business rules (associated with one or more content elements within a multimedia asset) to files uploaded to and/or identified by an external system (e.g., a web host) to be a copy of the multimedia asset. When a match is found between an uploaded file and a digital fingerprint identifying the multimedia asset, the external system may send a notification to the content owner, the notification including an identification of the multimedia asset associated with the matched digital fingerprint. In some embodiments, the notification may further include an identification of at least one time range of the multimedia asset contained within the uploaded file. More granular business rules may be applied by associating business rules based on temporal metadata associated with the multimedia asset. By analyzing the temporal metadata within the time range of the multimedia asset contained within the uploaded file, only those business rules applicable to that portion of the multimedia asset may be applied.

The use of metadata tagging for multimedia assets has recently expanded beyond identifying background information and technical properties regarding the asset on the whole, to tagging additional information regarding the asset to enable product features to be built into the asset. This type of metadata is referred to as temporal metadata. For example, a movie asset may include metadata tags to describe—in rich detail—the content elements and attributes of each scene in the movie, or even of individual frames of the movie. A temporal metadata tag is a single instance of descriptive metadata about the multimedia asset that is appended to a frame or a time range (e.g., time in, time out).

Besides enhancing the user experience, such tagging provides greater flexibility to content owners to apply business rules associated with the asset. Temporal metadata may comprise a whole host of different types of descriptive information about a scene or frame, such as the characters or actors present, the type of action, the time of day, the mood, the dialogue spoken, location, etc. Moreover, temporal metadata includes a time code reference. The time code reference is an indicator associating the temporal metadata with a particular moment or scene (e.g., sequence of frames) within the multimedia asset. In various embodiments, the time code reference is an indicator at the frame level of multimedia content, i.e., a start frame and a stop frame. Using this time code reference, the different descriptive attributes may be identified at a particular moment in time within the multimedia content.

Before describing the embodiments of the technology disclosed herein in detail, it may be helpful to describe an example environment which embodiments of the technology may be implemented. FIG. 1 shows an example environment 100 describing the digital fingerprinting process. For ease of discussion, the example environment 100 omits the network connections. Although not pictured, the communication between the user devices 112, the content owner 102, and the external system 108 may occur over a network. Some non-limiting examples of protocols over which the communication may occur include: cellular telecommunications protocols, such as GSM, UMTS, CDMA2000, LTE or WiMAX; wired communication methods, such as cable, DSL, dial-up, or fiber-optic; or wireless communication methods, such as satellite communications, Wi-Fi, Bluetooth, or near-field communication (NFC); or a combination thereof.

Content owners 102 may own or possess a plurality of multimedia assets 104. Non-limiting examples of multimedia assets 104 include: movies; televisions shows; songs or complete music albums; audiobooks; among other multimedia asset types. Although the technology of the present disclosure is discussed with respect to movie assets, embodiments of the technology are applicable to the types of multimedia assets identified above, as well as other digital multimedia assets to which metadata tags may be associated. The creation and attachment of temporal metadata tags to each multimedia asset 104 is outside the scope of the present disclosure.

As discussed above, digital fingerprinting utilizes one or more "fingerprints" associated with a multimedia asset 104, which are representative of unique characteristics or attributes of the multimedia asset 104. In various embodiments, the content owner 102 may create the digital fingerprints for each multimedia asset 104 using a fingerprint generator 106. The fingerprint generator 106 is a system configured to scan, analyze, and identify unique attributes of each multimedia asset 104 and create an asset profile comprising one or more digital fingerprints representing the unique attributes. In various embodiments, the content owner 102 may generate the digital profile itself. Third-party digital fingerprinting entities may be utilized in some embodiments, such that the third-party digital fingerprinting entities maintain the fingerprint generator 106.

After the digital profile is created for each multimedia asset 104 by the fingerprint generator 106, the digital profile may be sent to the external system 108 so that the external system 108 may be able to identify if any uploaded multimedia files 114 are all or part of a multimedia asset 104 of the content owner 102. In various embodiments, the external system 108 may be a networked server or web host accessible by the user devices 112 and the content owner 102. In various embodiments, the external system 108 may maintain a database 110 holding a plurality of digital profiles for a plurality of multimedia assets 104 from one or more content owners 102. Content owners 102 (or third-party digital fingerprinting entities, in some embodiments) may transfer updates to the database 110 as digital profiles are created using the fingerprint generator 106 for multimedia assets 104.

Users may communicate with the external system 108 through a user device 112. User devices 112 may be any number of computing devices, having a memory and a processor. Non-limiting examples of user devices 112 are: desktop computers; laptops; tablets; cell phones; smart phones; wearable technology, such as smart watches; PDAs; televisions; or other user devices. A user may upload a multimedia file 114 to a external system 108 using an upload interface 116 of the external system 108. A multimedia file 114 may be any type of digital file containing part or all of a multimedia asset 104. For example, a multimedia file 114 may be a copy of a multimedia asset 104, such as a movie or episode of a television series.

After upload, the external system 108 may utilize a content analyzer 118 to identify if the multimedia file 114 contains all or part of a multimedia asset 104. The content analyzer 118 compares each multimedia file 114 with one or more digital profiles maintained by the database 110. In various embodiments, the content analyzer 118 may be part of the upload interface 116. The content analyzer 118 scans the multimedia file 114 to determine whether a unique attribute of a multimedia content 104 based on the digital profile generated by the fingerprint generator 106. If a match is found, the external system 108 may notify the content owner 102 of the matched multimedia asset 104. In various embodiments, the notification for the external system 108 may be one or more digital fingerprints previously generated by the fingerprint generator 106 and stored in the database 110. Based on the notification, the content owner 102 may identify one or more business rules that the content owner 102 has developed for the matched multimedia asset 104.

For example, in some situations, the content owner 102 may want to control the type of advertising associated with presentation of a multimedia asset 104 on a web site or mobile app.

In various embodiments, the content owner 102 may communicate one or more business rules to the external system 108 such that the external system 108 may apply the rules or rules to the multimedia file 114. The content owner 102, in other embodiments, may receive the multimedia file 114 from the external system in addition to the notification, and apply the one or more business rules associated with the matched multimedia content 104 to the multimedia file 114 and transmit the modified multimedia file 114 back to the external system 108.

Having described an example environment in which the disclosed technology can be implemented, various features and embodiments of the disclosed technology are now described in further detail. After reading the description herein, it will be apparent to one of ordinary skill in the art that the disclosed technology can be implemented in any of a number of different environments. For ease of discussion, various embodiments of the technology disclosed herein will be discussed with the multimedia assets being movies. Although described in view of movies as the multimedia asset, one of ordinary skill would appreciate that various embodiments of the technology disclosed herein may be implemented with other forms of multimedia assets (e.g., music; television shows; etc.). Nothing in this disclosure should be interpreted to limit the scope of the claims to only movie assets.

Figure 2:
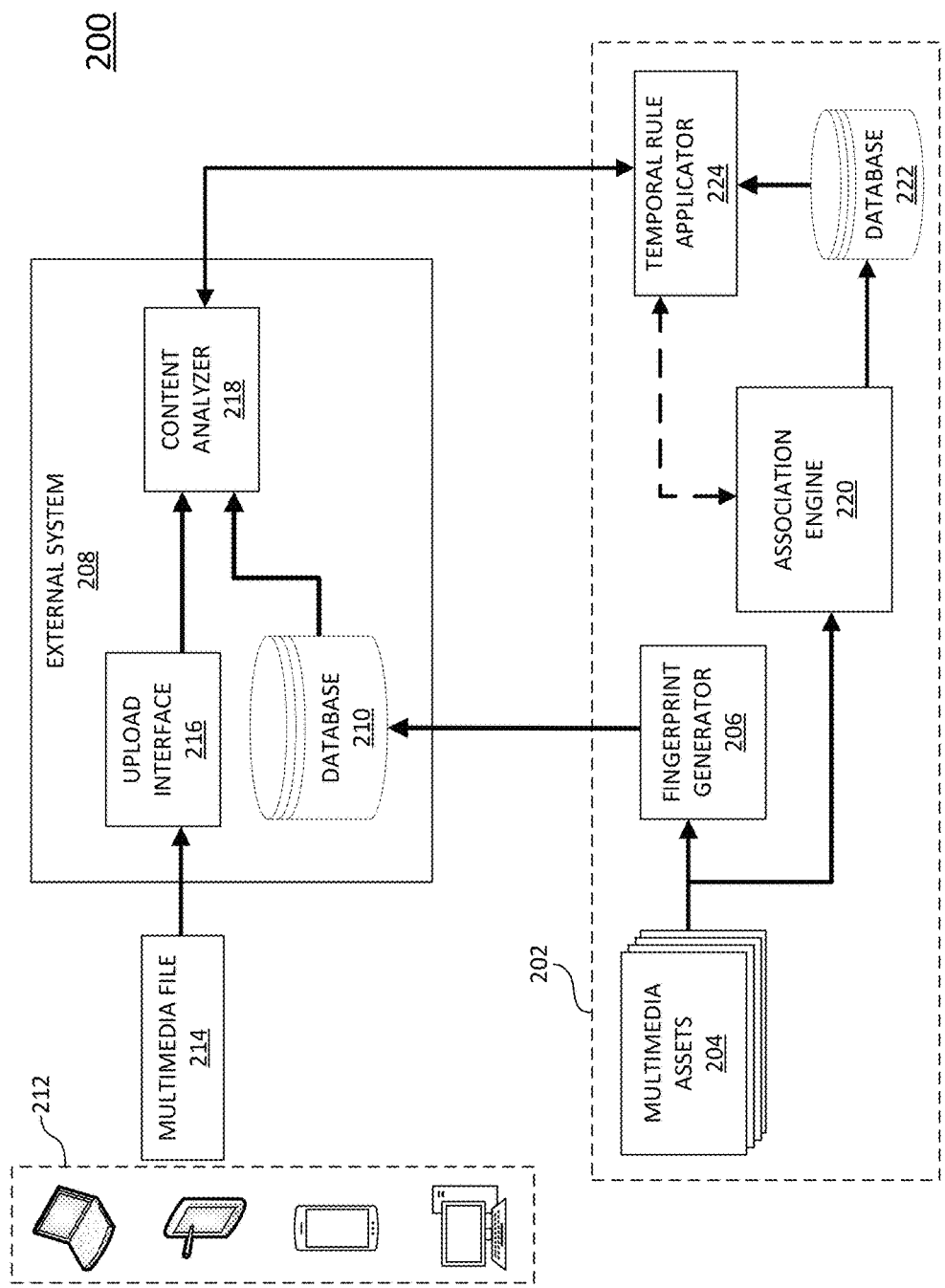
FIG. 2 illustrates an example temporal rule application system in accordance with various embodiments of the technology disclosed herein.

A more sophisticated system and method of applying business rules to uploaded multimedia files is disclosed herein, leveraging the ability to associate specific business rules designed for specific content (e.g., scenes) within the multimedia asset based on temporal metadata tags. FIG. 2 illustrates an example temporal rule application system 200 in accordance with various embodiments of the technology disclosed herein. The temporal rule application system 200 is similar to the example environment 100, and each similar component within the system functions in the same way as discussed above with respect to FIG. 1.

In addition to generating a digital profile using the fingerprint generator 206 for each multimedia asset 204, the content owner 202 may associate one or more business rules to specific content elements of each multimedia asset 204. An association engine 220 creates an association between 1) business rules designed by the content owner 202 for particular content elements (such as a scene in a movie and 2) the temporal metadata tags of the multimedia asset 204. Creating and appending the temporal metadata tags to the multimedia asset is beyond the scope of this disclosure. In various embodiments, the association engine 220 may associate one or more business rules to specific content elements within a multimedia asset 204 by creating a correlation between the temporal metadata tags of the content element and the relevant business rules. In various embodiments, the correlation created by the association engine 220 may be a list identifying one or more business rules for each temporal metadata tag of each multimedia asset 204. In some embodiments, the association engine 220 may maintain the correlations for each multimedia asset 204 in a database 222. In some embodiments, the fingerprint generator 206 may incorporate the association engine 220 into a single component, such that the content owner 202 may create the association at the same time as the digital fingerprints.

In various embodiments, the content owner 202 may include a temporal rule applicator 224. As discussed above, when business rules are applied to a multimedia file 214 detected to contain at least a part of a multimedia asset 204, the rules are determined based solely on the identity of the multimedia asset 204. No matter what content elements may be contained within the uploaded multimedia file 214, the same rules are applied to any multimedia file 214 uploaded and containing a portion of the multimedia asset 204. When applying business rules based on the content elements contained within the multimedia file 214, the difficulty of determining and applying rules properly increases as the content owner 208 needs to determine the applicable rules based on specific content contained within the multimedia file 214.

To determine what content elements are present in a multimedia file 214, the temporal rule applicator 224 retrieves an identification (e.g., one or more digital fingerprints) of the matched multimedia asset 204, as well as one or more time ranges of the multimedia asset 204 contained within the multimedia file 214. In various embodiments, the content analyzer 218 of the external system 208 may provide a notification to the temporal rule applicator 224, and the temporal rule applicator 224 may request the identification and relevant time ranges from the external system 208. In other embodiments, the external system 208 may send the identification and time ranges within the notification sent to the content owner 202. In some embodiments, the temporal rule applicator 224 may retrieve the uploaded multimedia file 214 that the content analyzer 218 matched with a multimedia asset 204.

The temporal rule applicator 224 may compare the identification and time ranges received from the external system 208 against the correlations generated by the association engine 220 and stored in the database 222. In some embodiments, the association engine 220 may transmit the correlations directly to the temporal rule applicator (illustrated by the dashed line in FIG. 2). The temporal rule applicator 224 may scan the time ranges contained within the multimedia file 214 to determine the temporal metadata tags included within those time ranges. Based on the temporal metadata tags included within the time ranges contained within the multimedia file, the temporal rule applicator 224 may perform a lookup within the database to determine one or more applicable rules based on the temporal metadata tags of the multimedia asset 204, identifying the content elements within the time ranges.

Once the temporal rule applicator 224 identifies the applicable rules, the temporal rule applicator 224 may in some embodiments forward the applicable rules to the external system 208 and instruct the external system 208 to apply the rules to the multimedia file 214. In other embodiments, the temporal rule applicator 224 may apply the rules to the multimedia file 214 and alter the exhibition of that multimedia file according to the rules. For example, the temporal rule applicator 224 may apply applicable rules to the multimedia file such that a particular advertisement accompanies the presentation of the multimedia file 214. In this way, the content owner 202 may still control how its multimedia assets 204 are presented despite not being directly involved in the uploading of the multimedia file 214.

In various embodiments, the temporal rule applicator 224 may apply a business rule identified for the matched multimedia content 204 based on the temporal metadata tags that results in generation of one or more suggested media assets. Suggested media assets may comprise in various embodiments other portions of the matched multimedia asset 204 (e.g., different time ranges), customized assets related to the multimedia asset 204 (e.g., "behind the scenes" videos, soundtrack, etc.), and/or other multimedia assets similar to the matched multimedia asset 204. The temporal rule applicator 224 may send the one or more suggested media assets to the external system 208, such that when the multimedia file 214 is accessed by a user of the external system 208, the external system 208 may suggest the suggested media assets to the user. In this way, the content owner 202 may promote other portions of the matched multimedia asset 204, or even suggest the user to access a file containing all or part of a different multimedia asset. In various embodiments, where the external system 208 may utilize a recommendation engine to predict suggested media that a user may like to access, the suggested media assets may serve as an input to the recommendation engine. A recommendation engine is a system applying prediction algorithms to determine other media that a user accessing a particular multimedia file 214 may also enjoy accessing, based on the characteristics of the multimedia file 214. In this way, the content owner 202 may exert some control over the types of additional files suggested to the user by the external system 208, without directly providing the suggested media assets to be presented.

Although described with respect to the content owner maintaining the temporal rule applicator 224, other embodiments of the example temporal rule application system 200 may have the temporal rule applicator 204 maintained by a third party applicator. The third party applicator may include the temporal rule applicator 224 or database 222, or a combination thereof in various embodiments. In such embodiments, the content owner 202 may periodically send updates to the third party applicator so that the most current rules are applied.

By associating business rules with content elements based on the temporal metadata tags, it is possible for a content owner 208 to further differentiate applicable rules for the same content elements at different moments within the multimedia asset 204. In such embodiments, the correlation created by the association engine 220 may be a time-sequenced listing of the content elements present within the multimedia asset 204. A content owner 202 may associate a first one or more business rules for a content element at one point, and a second one or more business rules for the same content element at a second point. For example, the content owner 208 may associate a first advertisement to be presented while a content element is present at a first time, and associate a second advertisement to be presented while the content element is present at a second time. This provides greater flexibility to the content owner 202 in customizing the presentation of the multimedia asset 204.

Figure 3:
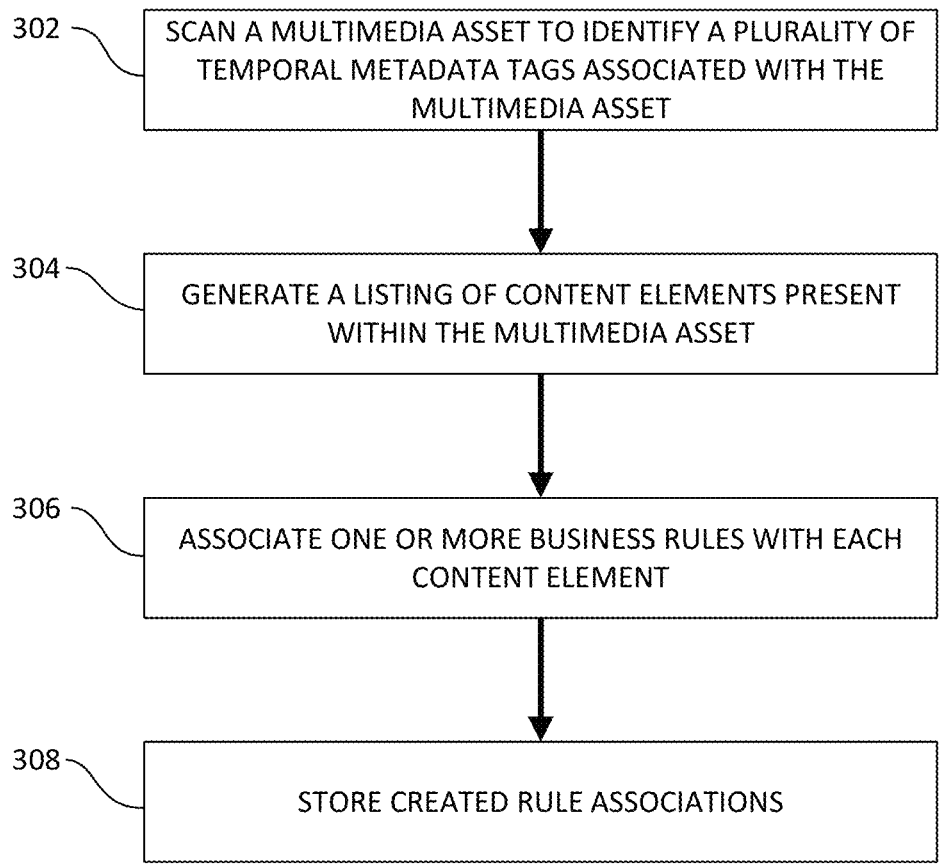
FIG. 3 illustrates an example temporal association process in accordance with various embodiments of the technology disclosed herein.

FIG. 3 is an example temporal association process 300 in accordance with various embodiments of the technology of the present disclosure. The example temporal association process 300 may be implemented within an association engine, such as the association engine 220 discussed above with respect to FIG. 2. At 302, a multimedia asset is scanned to identify content elements included. The temporal metadata of the multimedia asset identifies specific content elements present at specific moments within the multimedia asset. For example, a temporal metadata tag may state "character1," and every time that character 1 is present during the running time, the tag "character1" will be appended to the multimedia asset. In various embodiments, content elements may be identified by scanning the temporal metadata tags of the multimedia asset.

At 304, a listing of the content elements present within the multimedia asset may be generated. The listing is created based on the temporal metadata tags of the multimedia asset scanned. In some embodiments, the listing may be a time-based listing, identifying each time range when a content element is present within the multimedia asset. In such embodiments, the content owner may associate different business rules with the same content element during different time ranges at 306. The time-based listing may list out different time ranges, identify the content elements present, and correlating different business rules for each content element present.

In other embodiments, the listing in some embodiments may be an element-based listing, identifying each content element and listing all time ranges when the content element is present. In such embodiments, the content owners may be able to associate business rules to each content element at 306, regardless of the particular time range within which the content element is present, meaning that the same business rules will apply whenever the content element is present.

At 308, the created rule associations are stored for use later in identifying the applicable rules. In some embodiments, the created rule associations may be stored in a database and accessed by a multimedia file analyzer (e.g., the temporal rule applicator discussed with respect to FIG. 2). In other embodiments, the created rule associations may be sent to a multimedia file analyzer directly.

Figure 4:
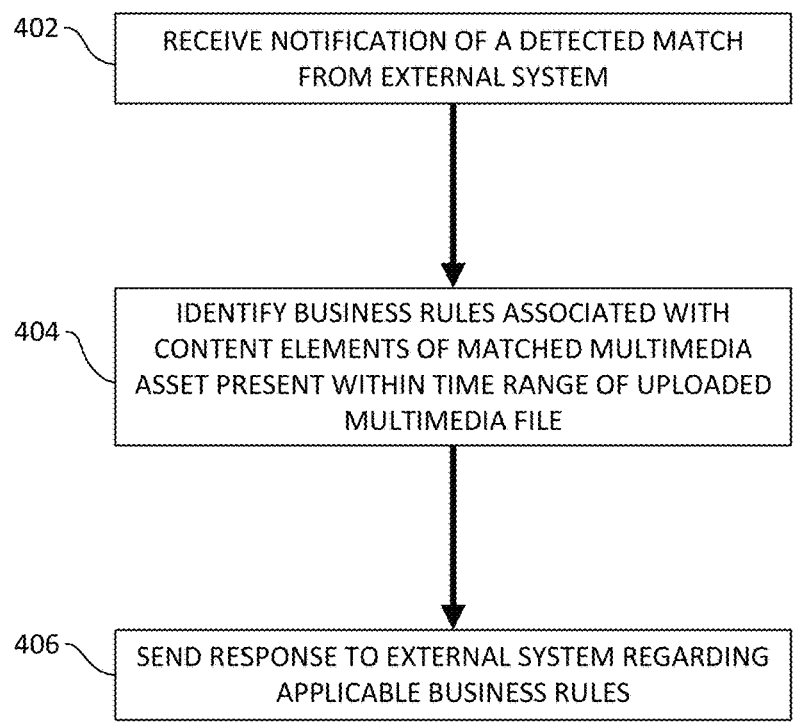
FIG. 4 is an example temporal rule determination process in accordance with embodiments of the technology disclosed herein.

FIG. 4 is an example temporal rule determination process 400 in accordance with embodiments of the technology of the present disclosure. In some embodiments, the example temporal rule determination process 400 may be implemented by a temporal rule applicator, such as the temporal rule applicator 224 discussed with respect to FIG. 2. At 402, the temporal rule applicator may receive a notification of a detected match from a web host or some other external system. In some embodiments, the notification may include one or more fingerprints associated with a matched multimedia asset that were identified by the external system, as discussed above with respect to the example environment 100 of FIG. 1. In various embodiments, the notification may include one or more time ranges of the matched multimedia asset contained within the analyzed multimedia file. In various embodiments, the temporal rule applicator may request fingerprint information and one or more relevant time ranges from the external system. In such embodiments, the external system may receive the request and transmit the fingerprint information and one or more relevant time ranges to the temporal rule applicator. The external system may also transmit the uploaded multimedia file that matched a multimedia asset in some embodiments so that the temporal rule applicator may scan the multimedia file itself or apply business rules.

At 404, the temporal rule applicator identifies one or more business rules associated with content elements of the matched multimedia asset that are present within one or more time ranges of the multimedia file. In various embodiments, the temporal rule applicator may retrieve a listing of applicable rules associated with content elements based on temporal metadata tags from a database or an association engine, similar to the list and retrieval discussed above with respect to FIG. 2. The list may be similar to the list discussed above with respect to the association engine discussed with respect to FIG. 2.

After determining the applicable rules, the temporal rule applicator may send a response to the external system regarding the applicable business rules. In various embodiments, the response may provide the one or more business rules to the external system, enabling the external system to apply the rules to the multimedia file prior to allowing access to the multimedia file. In some embodiments, where the uploaded multimedia file is provided to the temporal rule applicator, the response may include a modified multimedia file, with the applicable rules already applied.

By implementing embodiments of the technology disclosed herein, it is possible for content owners to exercise better control over the presentation of owned multimedia assets. Although digital fingerprinting enables external systems to determine when a multimedia file is a copy, or contains parts, of a content owner's multimedia assets, the external system is only able to identify the specific asset corresponding to the uploaded multimedia file. The content owner is thus limited in the diversity of business rules that may be applied to control the presentation of its owned assets. Implementations of embodiments of the technology of the present disclosure leverage the specificity and greater breadth of detailed information about the multimedia asset of temporal metadata to enable content owners to associate business rules with particular content elements of the multimedia asset. After being notified of a match through the traditional fingerprinting process, embodiments in accordance with the present disclosure can identify the exact content elements contained within the uploaded multimedia file, and accordingly apply the applicable rules. Content owners may create a listing of business rules associated with particular temporal metadata tags of a multimedia asset so that fine-grained rule application is possible.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

Figure 5:
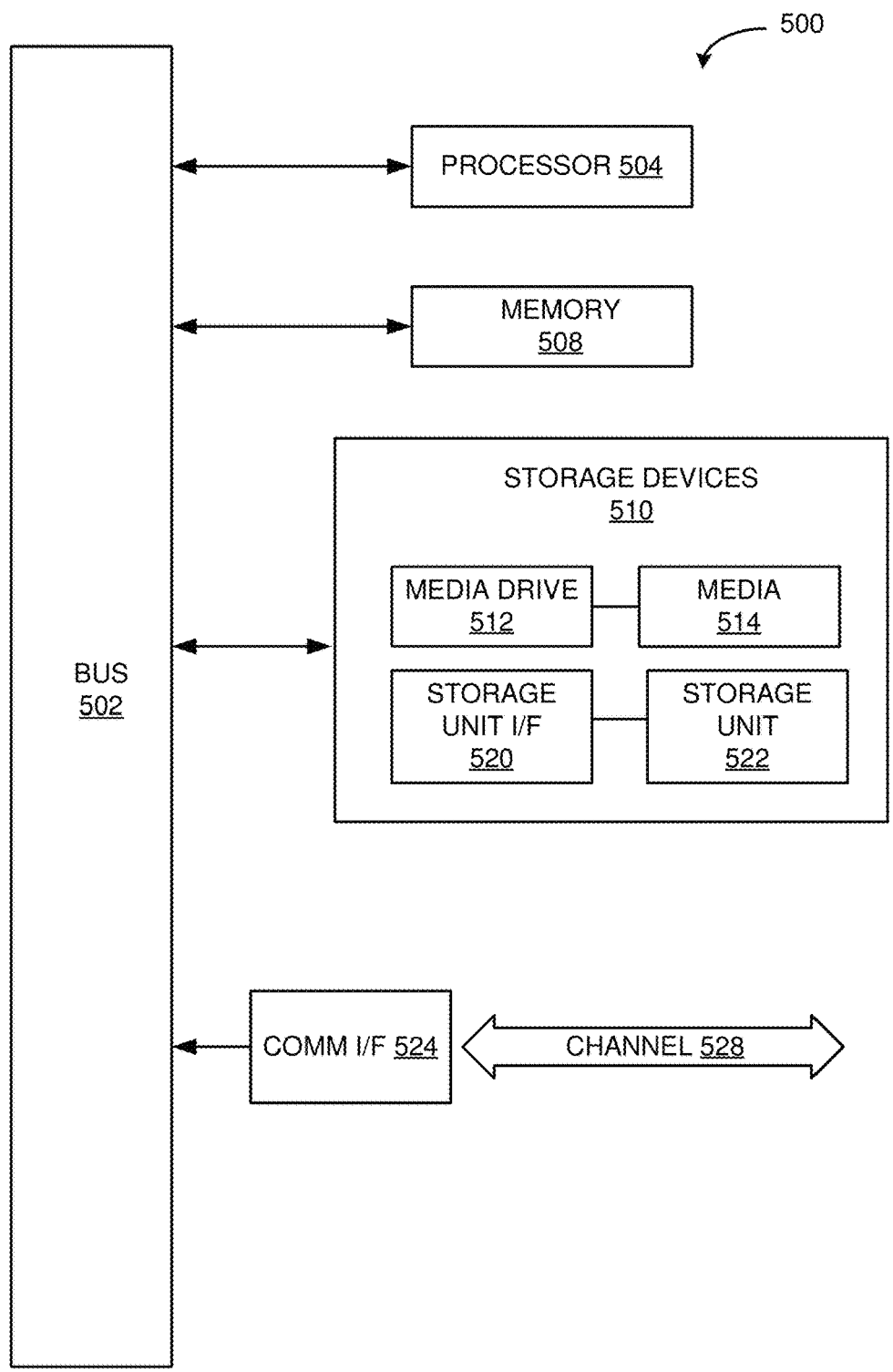
FIG. 5 illustrates an example computing component that may be used in implementing various features of embodiments of the disclosed technology.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the technology are implemented in whole or in part using software, in one embodiment, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the technology using other computing components or architectures.

Referring now to FIG. 5, computing component 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 500 might include, for example, one or more processors, controllers, control components, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing component 500 or to communicate externally.

Computing component 500 might also include one or more memory components, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot, a PCMCIA slot and card, and other fixed or removable storage units 522 and interfaces 520 that allow software and data to be transferred from the storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
    a database;
    a non-transitory computer-readable medium having instructions stored thereon that, when executed by a processor, causes the system to:
        receive a multimedia asset owned by a content owner, the multimedia asset associated with a plurality of temporal metadata tags identifying a plurality of content elements, wherein each of the plurality of temporal metadata tags is an instance of descriptive metadata about the multimedia asset that is appended to a frame or time range of the multimedia asset;
        generate a list associating a business rule with a content element of the plurality of content elements based on at least one of the temporal metadata tags, wherein the generated list comprises a time-sequenced listing of a plurality of different time ranges when one or more of the plurality of content elements is present, and wherein associating the business rules comprises associating a business rule with each of the plurality of different time ranges;
        store the generated list in the database;
        receive over a network from an external system a notification of a detected digital fingerprint match of an uploaded multimedia file based on a digital profile of the multimedia asset, wherein the uploaded multimedia file contains at least a portion of the multimedia asset, and wherein the notification comprises an identification of a time range of the multimedia asset included within the uploaded multimedia file; and
        after receiving the notification, using at least the generated list stored in the database and the identified time range to determine a business rule applicable to the uploaded multimedia file.

2. The system of claim 1, wherein the instructions, when executed by the processor, further cause the system to generate the digital profile, wherein the digital profile comprises a digital fingerprint for the multimedia asset, the digital fingerprint comprising a representation of a unique attribute of the multimedia asset.

3. The system of claim 2, wherein the external system is communicatively coupled to the system, the external system comprising a database for storing the digital profile generated for the multimedia asset.

4. The system of claim 1, wherein the instructions, when executed by the processor, further cause the system to request an identification of a matched multimedia asset and a time range of the matched multimedia asset included within the uploaded multimedia file.

5. The system of claim 4, wherein the instructions, when executed by the processor, further cause the system to request the external system to transmit the uploaded multimedia file.

6. The system of claim 1, wherein the instructions, when executed by the processor, further cause the system to request the external system to transmit the uploaded multimedia file.

7. The system of claim 1, wherein the system is a content owner system, and wherein the content owner system is communicatively coupled to the external system over the network.

8. A method, comprising:
    scanning a multimedia asset comprising a plurality of content elements;
    identifying a plurality of temporal metadata tags associated with the multimedia asset, wherein each of the plurality of temporal metadata tags is an instance of descriptive metadata about the multimedia asset that is appended to a frame or time range of the multimedia asset;
    using at least the plurality of temporal metadata tags, generating a list of the plurality of content elements present within the multimedia asset; and
    associating a business rule with each of the plurality of content elements included within the list, wherein the generated list comprises a time-sequenced listing of a plurality of different time ranges when one or more of the plurality of content elements is present, and wherein associating a business rule with each of the plurality of content elements comprises associating a business rule with each of the plurality of different time ranges.

9. The method of claim 8, further comprising: storing the generated list in a database.

10. The method of claim 9, further comprising: using the list to identify one or more business rules associated with content elements of an uploaded multimedia file that are present within one or more of the plurality of different time ranges of the multimedia asset, wherein the uploaded multimedia file contains at least a portion of the multimedia asset.

11. A method, comprising:
    receiving a notification of a detected match from an external system over a network, the notification comprising:
        an indication of a multimedia asset the external system detected as matching a multimedia file uploaded to the external system; and
        a time range of the multimedia asset included within the multimedia file;
    retrieving a list of a plurality of content elements from a database, the list associating a business rule with a corresponding content element based on at least one of a plurality of temporal metadata tags associated with the multimedia asset, wherein:
  the retrieved list identifies each content element of the plurality of content elements and lists all time ranges wherein each content element is presented; or
  the retrieved list comprises a time-sequenced listing of a plurality of different time ranges when one of the plurality of content elements is present;
identifying a business rule associated with a content element included within the time range of the multimedia asset included within the multimedia file using at least the retrieved list, wherein each of the plurality of temporal metadata tags is an instance of descriptive metadata about the multimedia asset that is appended to a frame or time range of the multimedia asset; and
sending a response to the external system regarding the identified business rule.

12. The method of claim 11, further comprising: sending a request to the external system for the indication of the multimedia asset the external system detected as matching the multimedia file uploaded to the external system and the time range of the multimedia asset included within the multimedia file.

13. The system of claim 1, wherein the generated list associates a second business rule with a second content element of the plurality of content elements based on at least one of the temporal metadata tags.

14. The system of claim 1, wherein using at least the generated list to determine a business rule applicable to the uploaded multimedia file comprises: identifying a business rule associated with a content element of the uploaded multimedia file that is present within one of the plurality of different time ranges of the multimedia asset.

* * * * *